United States Patent [19]

Kühnlein et al.

[11] 4,225,811

[45] Sep. 30, 1980

[54] DIRECT CURRENT MOTOR WITH POLYPHASE STATOR WINDING AND ELECTRONIC COMMUTATING DEVICE CONTROLLED BY AN ANGULAR POSITION TRANSMITTER

[75] Inventors: Hans Kühnlein, Nürnberg-Grossgründlach; Karl Schalk, Nuremberg; Georg Kögler, Schwabach, all of Fed. Rep. of Germany

[73] Assignee: Siemens Aktiengesellschaft, Munich, Fed. Rep. of Germany

[21] Appl. No.: 946,453

[22] Filed: Sep. 27, 1978

[30] Foreign Application Priority Data

Sep. 28, 1977 [DE] Fed. Rep. of Germany ....... 2743661

[51] Int. Cl.² .......................................... H02K 29/02
[52] U.S. Cl. .................................... 318/261; 318/138; 318/254; 318/290
[58] Field of Search ............... 318/138, 254, 256, 258, 318/261, 269; 86/288, 290, 685, 696

[56] References Cited

U.S. PATENT DOCUMENTS

| | | | |
|---|---|---|---|
| 3,742,329 | 6/1973 | Giguere | 318/138 |
| 3,958,163 | 5/1976 | Clark | 318/258 |

*Primary Examiner*—J. V. Truhe
*Assistant Examiner*—John W. Redman
*Attorney, Agent, or Firm*—Kenyon & Kenyon

[57] ABSTRACT

In a D.C. motor in which signals generated by an angular position transmitter control the commutation of the current flowing through the stator winding via a selection circuit containing Exclusive OR gates by means of which the polarity of the signals generated by the angular position transmitters can be reversed for the reversal of the direction of rotation, operating modes of "Operation" and "Braking" can be specified with only one command input for the Exclusive OR gates using an additional Exclusive OR gate.

1 Claim, 2 Drawing Figures

| INPUT COMMANDS | | OUTPUT COMMANDS |
|---|---|---|
| RUN / BRAKE "0"= RUN "1"= BRAKE | COUNTERCLOCKWISE / CLOCKWISE "0"=COUNTERCLOCKWISE "1"= CLOCKWISE | "0"=COUNTERCLOCKWISE "1"=CLOCKWISE |
| "0" | "0" | "0" |
| "0" | "1" | "1" |
| "1" | "0" | "1" |
| "1" | "1" | "0" |

DIRECT CURRENT MOTOR WITH POLYPHASE STATOR WINDING AND ELECTRONIC COMMUTATING DEVICE CONTROLLED BY AN ANGULAR POSITION TRANSMITTER

BACKGROUND OF THE INVENTION

This invention relates to a D.C. motor with polyphase stator windings and an electronic commutating device controlled by an angular position transmitter in general and more particularly to an inproved motor of this type.

Polyphase D.C. motors with commutating devices in which the signals generated by the angular position transmitters control the commutation of the current flowing through the stator winding through a selection circuit are known. The selection circuit contains switching elements via which the polarity of the signals supplied by the angular position transmitters can be reversed.

SUMMARY OF THE INVENTION

It is an object of the present invention to develop a motor of this type further so that it can be operated in the operating modes "Counterclockwise Rotation" or "Clockwise Rotation" and "Operation" or "Braking". According to the present invention, this problem is solved in a very simple manner by connecting the command input for the torque direction to the output of an Exclusive OR gate, the one input of which receives the input commands "Counterclockwise Rotation" or "Clockwise Rotation" while it other input receives the input commands "Operation" or "Braking", in the form of logic "1" and "0" signals.

BRIEF DESCRIPTION OF THE DRAWINGS

FIG. 1 is a basic circuit diagram of the motor of the present invention.

DETAILED DESCRIPTION OF THE INVENTION

Figure 2:
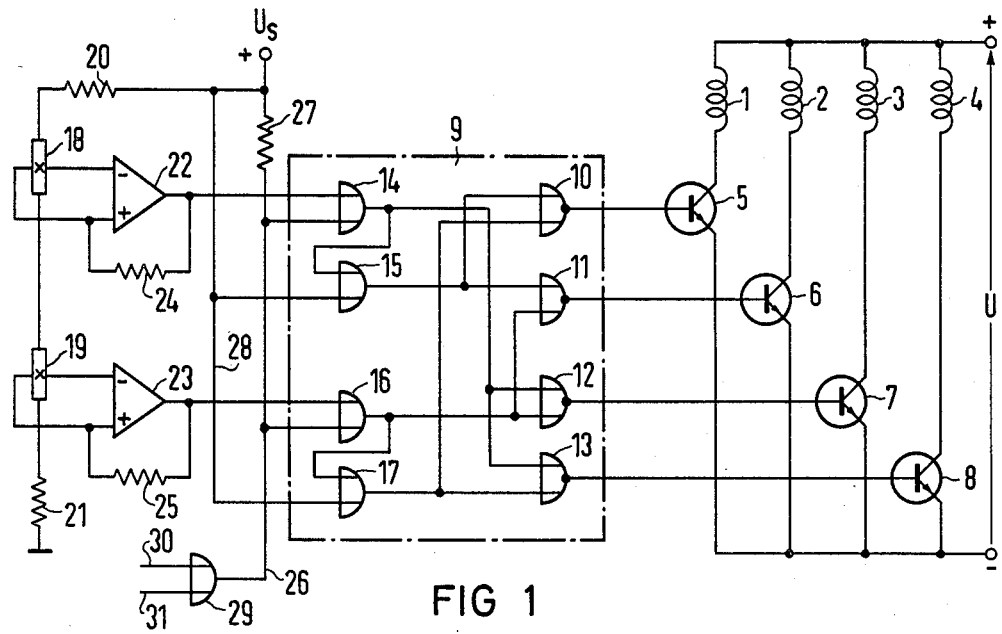
FIG. 2 is a truth table for the circuit of FIG. 1.

The D.C. motor shown in FIG. 1 has a stator winding consisting of four phase windings 1 to 4. One end of each of the four phase windings 1 to 4 is connected to a common point and to the positive pole of a D.C. voltage source U. The other end of each of the phase windings 1 to 4 is connectable to the negative pole of the D.C. voltage source via transistors 5 to 8. A selection circuit 9 controls the transistors 5 to 8. This selection circuit contains four NOR gates 10 to 13 and four Exclusive OR gates 14 to 17. The function of this selection circuit 9 will be explained in greater detail below.

Two Hall effect generators 18 and 19 are provided to pick up the angular position of the D.C. motor rotor. The control circuits of these Hall effect generators are connected in series and to a control voltage source $U_s$ via series resistors 20 and 21. The Hall electrodes of the Hall effect generators 18 and 19 are connected as inputs to operational amplifiers 22 and 23, respectively. The outputs of the operational amplifiers 22 and 23 are connected, through coupling resistors 24 and 25, respectively, to the noninverting input of the operational amplifiers. The output of the operational amplifier 22 is connected to one input of the Exclusive OR gate 14 and the output of the operational amplifier 23 to one input of the Exclusive OR gate 16. The other inputs of these two Exclusive OR gates 14 and 16 are connected to each other via a line 26 and represent the command input for the torque direction. The line 26 is connected to the control voltage source $U_s$ via a resistor 27. The outputs of the two Exclusive OR gates 14 and 16 are connected to the inputs of the two Exclusive OR gates 15 and 17, respectively. The other inputs of these two gates are also connected to the positive pole of the control voltage source $U_s$ via a line 28. An Exclusive OR gate is a gate whose output carries an "1" signal only when an "1" signal is applied to only one of the two inputs while an "0" signal is applied to the other one of the two inputs.

The output signals of the two operational amplifiers 22 and 23 are supplied to the selection circuit 9 for the control of the commutation of the motor, the individual gate 10 to 13 and 14 to 17 being linked to each other so that the transistors 5 to 8 go into conduction in a certain, specified order, thereby energizing the individual phase windings 1 to 4 successively, the successive windings energized always separated by 90° geometrically. The torque direction can be changed in a manner known per se by reversing the polarity of the signals generated by the operation amplifiers 22 and 23 using the command input 26. In other words, an "1" signal or an "0" signal is applied to the line 26 in acccordance with the preselected direction of rotation.

Now, in order to be able to carry out the operating modes "Operation" or "Braking" and "Counterclockwise Rotation" or "Clockwise Rotation" with only one command input 26 for the torque direction, another Exclusive OR gate 29 is provided whose one input 30, for instance, receives the input commands "Clockwise Rotation" or "Counterclockwise Rotation" in the form of "1" signals and "0" signals. The other input 31 receives the same signals for the operating modes "Operation" and "Braking".

The respective linkage of these signals is shown in the truth table of FIG. 2. It is evident therefrom that the torque direction is automatically determined as a function of the above input conditions. It is irrelevant for which one of the various operating modes a "1" signal or a "0" signal is used.

What is claimed is:

1. In a direct current motor with polyphase stator windings and an electronic commutating device controlled by angular position transmitters, in which the signals generated by the angular position transmitters control the commutation of the current flowing through the stator winding through a selection circuit containing switching elements responsive to a command input for torque direction to reverse the polarity of the signals generated by the angular position transmitters, the improvement comprising:
an Exclusive OR gate providing its output as the command input for torque direction, said gate having one input adapted to receive an input signal at one of two logic levels, one level indicating "Counterclockwise Rotation" and the other logic level "Clockwise Rotation" and its other input adapted to receive an input signal at one of two logic levels, one level indicating "Operation" and the other "Braking".

* * * * *